United States Patent
Lieder et al.

(10) Patent No.: US 10,118,693 B2
(45) Date of Patent: Nov. 6, 2018

(54) GEARWHEEL SET, IN PARTICULAR FOR A GYROPLANE

(71) Applicant: ZF FRIEDRICHSHAFEN AG, Friedrichshafen (DE)

(72) Inventors: Sergej Lieder, Kassel (DE); Reinhold Ruhland, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/381,703

(22) PCT Filed: Feb. 1, 2013

(86) PCT No.: PCT/EP2013/051980
§ 371 (c)(1),
(2) Date: Aug. 28, 2014

(87) PCT Pub. No.: WO2013/127595
PCT Pub. Date: Sep. 6, 2013

(65) Prior Publication Data
US 2015/0059523 A1    Mar. 5, 2015

(51) Int. Cl.
B64C 27/12       (2006.01)
*F16H 55/08*     (2006.01)
*F16H 1/12*      (2006.01)

(52) U.S. Cl.
CPC ............... *B64C 27/12* (2013.01); *F16H 1/12* (2013.01); *F16H 55/08* (2013.01); *F16H 55/0806* (2013.01); *F16H 55/0813* (2013.01); *Y10T 74/1966* (2015.01); *Y10T 74/19074* (2015.01)

(58) Field of Classification Search
CPC ....................................................... B64C 27/12

USPC ................................................. 244/60; 74/664
See application file for complete search history.

(56) References Cited

U.S. PATENT DOCUMENTS

| | | | | | |
|---|---|---|---|---|---|
| 2,304,586 | A | * | 12/1942 | Miller | B23F 15/06 407/23 |
| 2,448,187 | A | * | 8/1948 | Morgan | F16H 55/22 74/458 |
| 2,758,513 | A | * | 8/1956 | Deakin | B23F 5/20 409/38 |
| 4,036,073 | A | * | 7/1977 | Kitano | F16H 35/02 74/393 |
| 4,489,625 | A | * | 12/1984 | White | B64C 27/14 244/60 |

(Continued)

FOREIGN PATENT DOCUMENTS

| DE | 23 20 340 A1 | 11/1974 |
|---|---|---|
| WO | 2011/147582 A2 | 12/2011 |

OTHER PUBLICATIONS

International Search Report dated Jul. 26, 2013 in International Application No. PCT/EP2013/051980.

(Continued)

*Primary Examiner* — Brian M O'Hara
*Assistant Examiner* — Keith L Dixon
(74) *Attorney, Agent, or Firm* — Brinks Gilson & Lione

(57) ABSTRACT

The present disclosure relates to a gear set, especially for a rotary-wing aircraft, with two intermeshing gear wheels, each mounted on a respective shaft. In particular, in a normal section, the gear wheels of the gear set have different pressure angles on a drive side from the pressure angles on a freewheel side at the beginning of an engagement.

16 Claims, 3 Drawing Sheets

(56) References Cited

U.S. PATENT DOCUMENTS

Figure 1A:
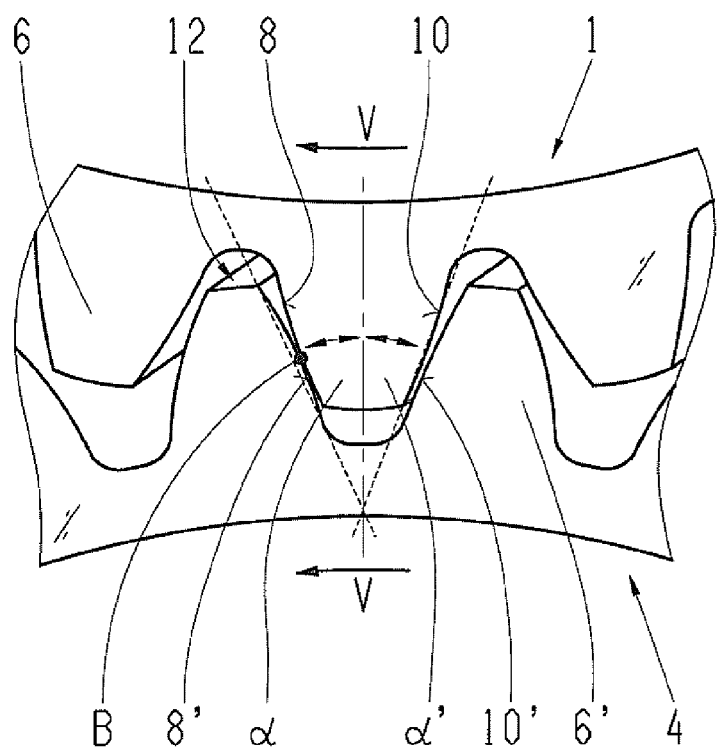

| | | | | |
|---|---|---|---|---|
| 6,048,186 A * | 4/2000 | Kitano | ............... | G01F 3/10 |
| | | | | 418/190 |
| 6,467,726 B1 * | 10/2002 | Hosoda | ............ | B64C 27/14 |
| | | | | 180/337 |
| 7,413,142 B2 * | 8/2008 | Gmirya | ............ | B64C 27/10 |
| | | | | 244/17.23 |
| 7,434,764 B2 * | 10/2008 | Lappos | ............ | B64C 27/14 |
| | | | | 244/17.11 |
| 2003/0015166 A1 * | 1/2003 | Seymour | ........... | F02B 61/04 |
| | | | | 123/198 R |

OTHER PUBLICATIONS

International Search Report and Written Opinion from corresponding International Patent Application PCT/EP2013/051980, dated Jul. 26, 2013 (German Language).

Office Action dated Mar. 27, 2013 in German Application No. 10 2012 203 177.4, including translation of p. 5 (German Language).

* cited by examiner

GEARWHEEL SET, IN PARTICULAR FOR A GYROPLANE

This application is a filing under 35 U.S.C. § 371 of International Patent Application PCT/EP2013/051980, filed Feb. 1, 2013, and claims the priority of DE 10 2012 203 177.4, filed Mar. 1, 2012. These applications are incorporated by reference herein in their entirety.

The present disclosure relates to a gear set, especially for a rotary-wing aircraft with two intermeshing gear wheels, each mounted on a respective shaft.

Gear wheels of this type are well-known in prior art. Here two gear wheels provided with gear teeth at their outer circumference are engaging with one another. Each gear wheel is mounted in torque-proof manner on a shaft which forms the pivot point.

Gear sets may have different tooth profiles. A popular tooth profile is the so-called involute gearing in which the two tooth flanks of the gear teeth designed at the gear wheel form an involute. The involute gearing is characterized in that a pressure angle (in the field of gearing technology often depicted with $\alpha$), which is an angle between the tangent at the pitch circle in the pitch point (in the field of gearing technology often depicted with C) and the normal of engagement, is constant during the path of contact traversed when the gear teeth are meshing. In this context, the normal of engagement involves the normal on the tangent at the respective instantaneous point of contact of the tooth flanks of two intermeshing gear teeth.

Through the geometric trace of the points of contact during the engagement (i.e., the path of contact), the variation of the pressure angle $\alpha$, the tooth profile geometry, and thus the shape of the tooth flanks, are clearly determined. As a result, a flank angle $\alpha$ corresponding to the pressure angle $\alpha$ can be associated with each point (segment area) of the tooth flank.

Usually, involute gear wheels well-known in prior art have a pressure angle $\alpha$ of 14.5°, especially preferred of between 20° and 25°. Accordingly, the respective flank angle $\alpha$ of both tooth flanks of each gear tooth amounts to 14.5°, especially preferred to between 20° and 25°, at each point (segment area) of the tooth flank at which two opposite tooth flanks touch during the engagement (usable tooth flank surface). In the involute tooth system, the tooth profile is, and thus the tooth flanks are, symmetric.

In the generic gear set, power transmission between the tooth flanks always takes place in the normal direction of engagement. In relation to the pitch circle of the gear wheel, a normal force impacting during the intermeshing process said gear wheel from an opposite tooth flank of the other gear wheel can be divided in a circumferential direction force component and a radial force component. In helical gearing in which the gear teeth are designed to be inclined against the rotational axis about a helix angle $\beta$, a so-called axial force component occurs in addition to the circumferential direction force component and a radial force component taking place in straight-toothed gear wheels. Consequently, effective power transmission depends on the tooth flank geometry and thus on the flank angle $\alpha$ and the pressure angle $\alpha$.

For low-noise operation of the gear wheels of the gear set, the selection of the so-called transverse contact ratio is important. Therefore, in this respect, a long profile overlap is preferred, which corresponds to an increased profile overlap (ratio between contact length and graduation).

The longer the contact length, and thus the higher the contact ratio, the lower inevitably the flank angle $\alpha$ or pressure angle $\alpha$ for the usual symmetric tooth profiles.

To increase the lifespan of the gear wheels, the tooth base and/or tooth flank load capacities have to be increased by selecting an increased flank angle $\alpha$.

The symmetric tooth profile of the gear wheels contained in generic gear sets results in conflicting requirements: large tooth flank angles $\alpha$ or pressure angles $\alpha$ are to be preferred with respect to the lifespan; maximizing the contact ratio is preferred for low-noise operation, which involves a low flank angle $\alpha$ or pressure angle $\alpha$.

The present disclosure is based on the object of providing a gear set of the type mentioned above, especially for a rotary-wing aircraft, which has an increased lifespan.

The present disclosure also provides a rotary-wing aircraft transmission, as well as a drive train for a rotary-wing aircraft and a rotary-wing aircraft, respectively with an increased lifespan.

To achieve this object, a gear set especially for a rotary-wing aircraft is provided which has the characteristics of the claims. Said gear set is different from prior art in that in normal section the gear wheels have different pressure angles $\alpha$, $\alpha'$ at the beginning of an engagement.

Therefore, the present disclosure provides a gear set in which the gear wheels are rotated only in a preferential direction when transmitting torque. Accordingly, the tooth profile of the gear teeth formed at the gear wheels is not designed in symmetric fashion. The geometry of the two tooth flanks of a gear tooth, thus also the flank angle $\alpha$, $\alpha'$ and the pressure angle $\alpha$, $\alpha'$ are selected differently, at least at the beginning of the engagement. However, the geometry of tooth flanks of the gear teeth of different gear wheels, which are respectively opposite of one another during an engagement, can be the same.

Because the gear set is particularly designed to improve the transmission function in only one direction of rotation, two tooth flanks, which are adjoining when the gear wheels are rotating in the preferential direction to transmit torque are depicted as tooth flanks on the drive side, and the two other tooth flanks, which are respectively opposite of one another when the gear wheels are intermeshing and rotating in preferential direction on a freewheel side, are depicted as tooth flanks on the freewheel side. Accordingly, each gear tooth has a tooth flank on the drive side and a tooth flank on the freewheel side.

In the transmission of torque, the opposite freewheeling tooth flanks run free, whereas the tooth flanks on the drive side touch at one point (segment area) for the transmission of torque.

During the engagement of the gear teeth of the two gear wheels when rotating in a predetermined direction, the two opposite tooth flanks on the drive side touch one another for the first time at the beginning of the engagement at a point depicted as an access point of contact and for the last time at a point depicted as an exit point of contact. The normal to the tangent at the access point of contact through the pitch point (in the field of gearing technology often depicted with C) intersects with the tangent at the pitch circle in the pitch point C under the pressure angle $\alpha$.

At the access point of contact, the respective tooth flanks on the drive side have a pressure angle which corresponds to the flank angle $\alpha$ at the access point of contact and thus is predetermined by the tooth flank geometry. When rotating against the preferential direction, the tooth flanks of the gear teeth on the freewheel side touch in both intermeshing gear wheels in the same way as the tooth flanks on the drive side when the gear wheels rotate in preferential direction for the first time in a further access point of contact. As described above with regard to the rotation along the preferential direction, also in this case it is possible to design a further pressure angle $\alpha'$ or a further flank angle $\alpha'$ at the further access point of contact. Because of the fact that the tooth flanks of the gear teeth on the drive side and the tooth flanks of the gear teeth on the freewheel side have different geometries, in other words, they have an asymmetrical tooth profile, the tooth flanks on the freewheel side have a different pressure angle at the further access point of contact than the tooth flanks on the drive side at the access point of contact. Therefore, according to the present disclosure, the two intermeshing gear wheels of the gear set has two different pressure angles $\alpha$, $\alpha'$ at the beginning of the engagement.

According to the present disclosure, a "normal section" involves a section through the gear wheel along the normal to a direction of the course of the tooth tips. For so-called straight-toothed gear wheels, in which the tooth tips extend along the gear wheel axis, the normal section corresponds to a face section. In helical gears, the normal section corresponds to the section through the gear wheel about the helix angle ß offset in relation to the face section. In spiral gear wheels, it is possible to design an analogous normal section.

Because of the asymmetric profile of the gear teeth and the resulting different pressure angles $\alpha$, $\alpha'$ at least at the access point of contact, that is at the beginning of the engagement, the surface pressure is changed at least at this point on a tooth flank on the drive side (when operating in preferential direction) in relation to a tooth flank on a freewheel side (when operating opposite to the preferential direction). Especially by increasing the pressure angle $\alpha$ or flank angle $\alpha$ at the beginning of the engagement, reduced surface pressure at the point of contact is achieved, resulting in a gear set with an increased lifespan.

Furthermore, the so-called pitch, that is the distance between two successive gear teeth, can be maintained for the respective gear wheel compared to a gear wheel having a symmetric tooth profile. For this purpose, the tooth flank angle $\alpha'$ of the tooth flank on the freewheel side is decreased at least at the access point of contact compared to a gear wheel having symmetric tooth profile and the tooth flank angle $\alpha$ on the drive side is increased at the access point of contact compared to a respective gear wheel having symmetric tooth profile. Compared to a respective gear wheel having a symmetric tooth profile, the path of contact is may not be changed.

In other words, especially because of the fact that at least at the beginning of the engagement both tooth flanks have different pressure angles $\alpha$, $\alpha'$ or respectively different tooth flank angles $\alpha$, $\alpha'$, by selecting an asymmetric tooth flank, it is possible to increase the lifespan of the gear set which is operated in only one preferential direction.

According to another form of the present disclosure, during the engagement the pressure angle $\alpha$ should show a different course on the drive side of the gear teeth of one of the gear wheels than on the freewheel side of the gear teeth of the same gear wheel.

In the special case of involute-toothed gear wheels, the pressure angle $\alpha$, $\alpha'$ is constant during the entire time of engagement. Accordingly, the path of contact, that is the course of the geometric trace of the respective points of contact of tooth flanks touching one another during the engagement, forms a straight line which extends through the pitch point and which is a tangent at the base diameter of the two gear wheels.

In the case of a different geometry of tooth profile, the path of contact is not provided by a straight line. As a result, the pressure angle traverses different values during the process of engagement. According to this form, the pressure angle shows during the entire process of engagement a different course on the drive side of the gear teeth than on the freewheel side of the gear teeth. When rotating the gear wheels about the preferential direction, each point of contact can be assigned a different pressure angle during the engagement.

Just as for the rotation in preferential direction, when rotating against the preferential direction, each point of contact of the opposite tooth flanks on the freewheel side can be assigned a usually different pressure angle $\alpha'$ during the engagement. The course of the pressure angle $\alpha'$ when rotating in preferential direction is different from the course of the corresponding pressure angle $\alpha'$ when rotating opposite to the preferential direction.

In the area in which opposite tooth flanks touch one another during the process of engagement, the gear wheels of the present disclosure-based gear set have no undercut contours. However, undercuts not located in these so-called effective flank regions can still be available.

In another form of the present disclosure, the pressure angle on the drive side should range between 25° and 45°, especially between 28° and 32°. Alternatively or supplementary, the pressure angle on the freewheel side should range between 10° and 20°, especially between 14° and 16°. The larger the selected pressure angle $\alpha$ or flank angle $\alpha$, the more the surface pressure is reduced or the tooth base strength and flank load capacity is increased. However, in gear wheels known in prior art, this inevitably increases the graduation. In particular, one objective of this form of the present disclosure is to maintain the graduation and, at the same time, increase the pressure angle $\alpha$ on a tooth flank (the tooth flank on the drive side) of the gear tooth to the extent to which the pressure angle $\alpha'$ on the other tooth flank of the gear tooth (the gear tooth on the freewheel side) is decreased. The above-mentioned intervals proved to be suitable to be used in rotary-wing aircrafts for increasing the lifespan of gear wheels. It is especially advantageous to keep the sum of the respective pressure angles $\alpha$ on the drive side and on the freewheel side constant on the respectively corresponding point of contact, which results when rotating the gear wheels opposite to the preferential direction.

When there is no involute gearing, the pressure angle $\alpha$, $\alpha'$ varies during the engagement on the drive side, as well as on the freewheel side. In this case, it is especially preferred when the pressure angle $\alpha$, $\alpha'$ is selected in such a way that it does not leave the pressure angle intervals previously mentioned. When there is a varying pressure angle $\alpha$, $\alpha'$ during the engagement, it is especially preferred that the gear wheels are designed in such a way that the sum of both pressure angles $\alpha$, $\alpha'$ remain constant during the engagement.

According to another form of the present disclosure, the two gear wheels should be designed as involute gear wheels. It is especially beneficial to select a tooth profile in which an involute geometry of the one tooth flank differs from an involute geometry of the other tooth flank of the same gear tooth. Because of the fact that in involute gear wheels the pressure angles $\alpha$, $\alpha'$ or flank angles $\alpha$, $\alpha'$ are constant during the engagement, the gear wheels of the present disclosure-based gear set have a different pressure angle $\alpha$ during an engagement in preferential direction than during an engagement opposite to the preferential direction. The preferred intervals previously mentioned also apply in involute gearing. An example would be an angle pair within the specified range with a pressure angle α of 30° on the drive side and a pressure angle α' of 15° provided on the freewheel side.

Usually the gear wheels of the gear set can be designed in the form of cylinder wheels, bevel wheels, helical gears or worm wheels. However, preferred are bevel wheels. Bevel wheels usually have axes that are vertically, inclined or radially offset to one another. Especially when using gear wheels in air-wing aircrafts, for example, in the main rotor system of helicopters, the use of bevel wheels is preferred because of the low degree of wear.

In still another form of the present disclosure for low-noise operation, the gear wheels are not straight, but have a helical or spiral design.

According to a subordinate aspect and to solve the problem regarding the rotary-wing aircraft transmission, the present disclosure provides a transmission for a rotary-wing aircraft which has a drive system, a main rotor or tail rotor showing the characteristics of the claims.

According to the present disclosure, rotary-wing aircrafts involve all aircrafts which have rotating wings, in particular helicopters, gyroplanes, compound aircrafts, combination aircrafts and convertiplanes. In the simplest case, a single gear set can form a present disclosure-based transmission which, for example, transmits a torque and a rotational speed from a drive system to a main support rotor or to a tail rotor. The present disclosure-based transmission can be operated in wear-resistant manner when the gear wheels rotate in preferential direction.

The present disclosure presents a drive train for a rotary-wing aircraft which can be operated in wear-resistant manner. Such a drive train contains a drive system and a transmission gear unit arranged in power flow direction between the drive system and a main support rotor, as well as a main rotor system arranged in power flow direction between the drive system and the main rotor. Such a main support rotor at least contributes to the fact that rotary-wing aircrafts can be kept in the air, i.e., it generates lift. A transmission gear unit involves a transmission which reduces at least partially a speed transmission from a comparatively high (drive) speed to a comparatively low speed (of the main support rotor). In a main support rotor system, the shafts (i.e., an input shaft which is usually associated with a drive shaft of the drive system and an output shaft) provided with intermeshing gear wheels are arranged in an inclined position or not in parallel to one another. Usually, the output shaft extends in the direction of the main rotor. Usually the input shaft of the main support rotor system extends in longitudinal direction of the rotary-wing transmission, whereas the second shaft usually extends in the direction of the main support rotor and thus in vertical direction of the rotary-wing aircraft.

The transmission gear unit and/or the main rotor system should contain at least one gear set according to the present disclosure.

According to a further development, the drive train contains an intermediate transmission and/or a tail rotor transmission which is arranged in power flow direction between the drive and the tail rotor. The tail rotor and/or intermediate transmission contains at least one gear set according to the present disclosure.

In the tail rotor and/or intermediate transmission, the rotational speed on the drive side or main rotor side is transmitted to a rotational speed on the tail rotor side, i.e., a speed of the tail rotor. Furthermore, in the tail rotor and/or intermediate transmission, the power flow is redirected from an input direction to the direction of the tail rotor. In rotary-wing aircrafts, the intermediate transmission is usually arranged in power flow direction behind the main support rotor system and in front of the tail rotor transmission. Accordingly, a drive speed from a drive system is usually transmitted to a predetermined speed of the main rotor by the transmission gear unit. In the main rotor system, the power flow direction is preferably transmitted from the longitudinal direction of the rotary-wing aircraft to a different direction, the direction of the main rotor. Usually, the intermediate transmission is charged with the speed of the main rotor on the drive side and transmits said speed to the speed of the tail rotor on the output side. In the tail rotor transmission, the power flow is redirected to the direction predetermined by the tail rotor.

According to a further subordinate aspect, a rotary-wing aircraft, which is provided with a rotor and a drive system for the rotor, is proposed especially to be used for load transportation and/or transportation of passengers. Such a rotary-wing aircraft is characterized in that a transmission, which has at least one gear set according to the present disclosure, is provided between the drive system and the rotor.

At the same time, the present disclosure pays special attention to the gear sets of the rotary-wing aircrafts, which gear sets are especially stressed. To illustrate the material requirements, several figures typical for helicopters, to which the preferred further development can apply, are subsequently indicated in an exemplary manner.

For example, the drive system of a helicopter has a rotational speed of 12,000 rpm. The transmission from the drive system to a main support strand ranges between 0.01 and 0.02, to the tail rotor usually ranges between 0.2 and 0.3. The weight of a main reduction gear unit of the rotary-wing aircraft can range between 300 kg and 3,000 kg.

Figure 1B:
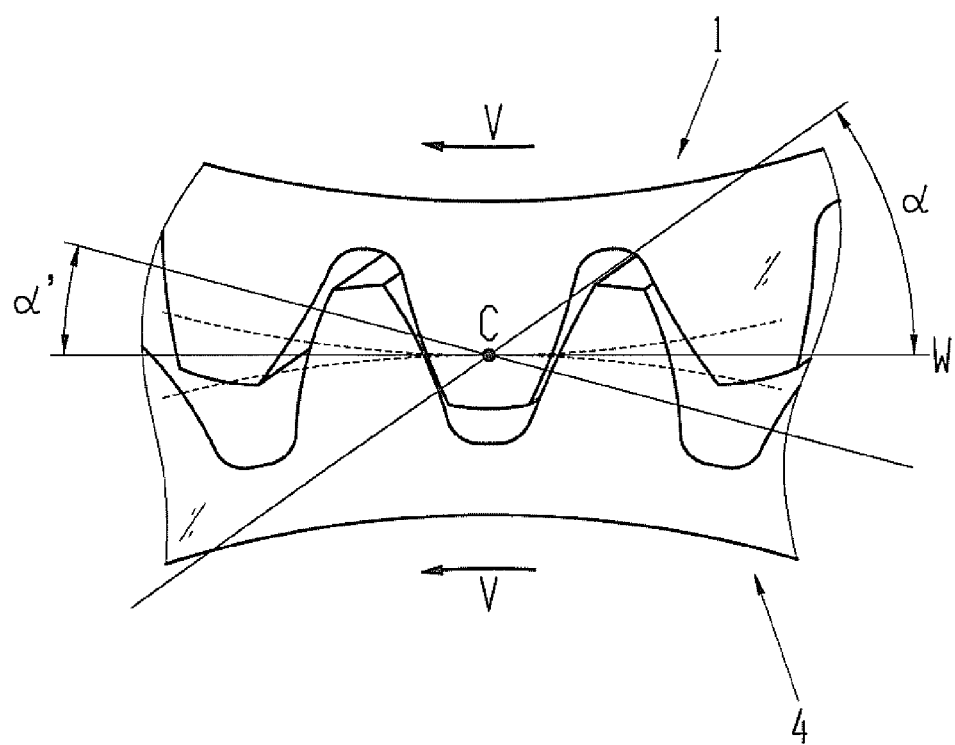
Figure 2:
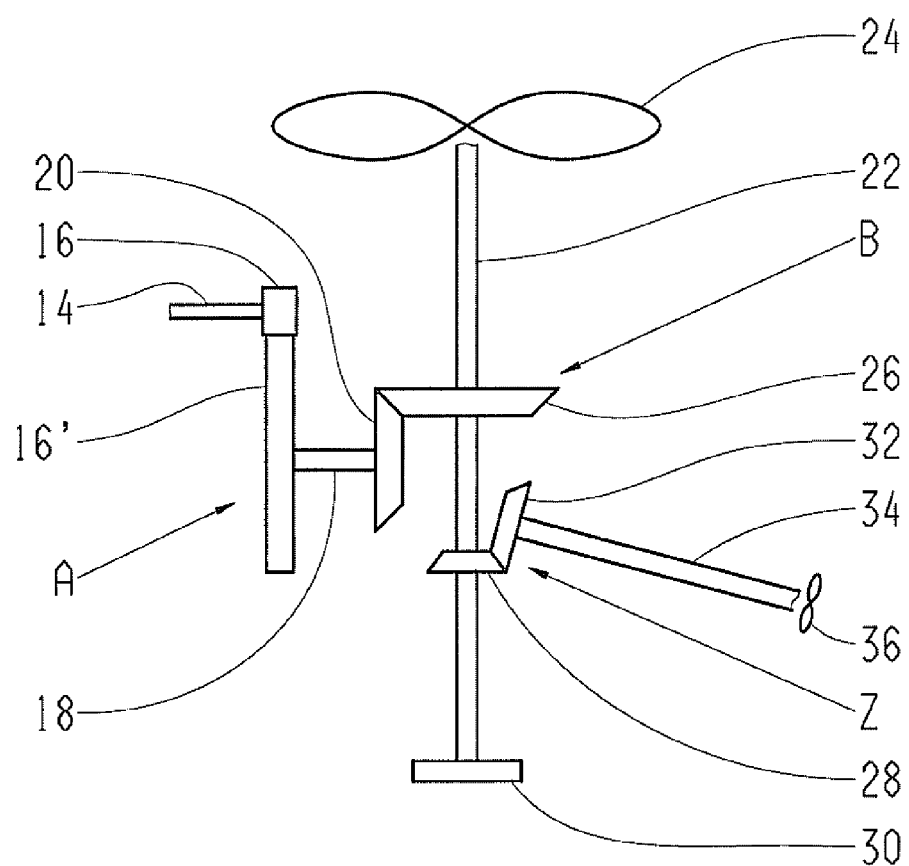

Further details and advantages of the present disclosure are included in the following description of an embodiment in conjunction with the drawing. It is shown:

FIG. 1a is a schematic partial view of two intermeshing tooth profiles of a gear set, FIG. 1b is the same view of the gear set shown in FIG. 1a with additional auxiliary line structures, and FIG. 2 is a schematic representation of a main reduction gear unit of a helicopter.

FIGS. 1a and 1b show a section of intermeshing gear wheels 1, 4 of a gear set. Reference numeral 1 depicts a first gear wheel, which is mounted in torsion-resistant manner on a shaft (not shown), which gear wheel is associated in power flow direction with a drive system, and in FIG. 1a it is rotated clockwise by the drive system in a preferential direction V. The first gear wheel 1 transmits a torque and a rotational speed to a second gear wheel 4 associated with an output side of the gear set 1, 4. Said second gear wheel is mounted as fixed gear on a shaft (not shown).

The first gear wheel 1 has gear teeth 6 that are intermeshing with gear teeth 6' of the second gear wheel 4. Each tooth of the gear teeth 6 of the first gear wheel 1 has a tooth flank 8 on the drive side and a tooth flank 10 on the freewheel side. Each tooth 6' of the second gear wheel 4 has a tooth flank 8' on the drive side and a tooth flank 10' on the freewheel side. Two respective tooth flanks 8, 8' on the drive side of the first and second gear wheel 1, 4 and two tooth flanks 10, 10' on the freewheel side of the first and second gear wheel 1, 4 are located opposite from one another. In FIGS. 1a and 1b, the gear set is shown in normal section. In relation to the normal section, the section through the gear wheel along the normal to a direction of the course of the tooth tips 12, the tooth profile is symmetric.

The tooth flanks are located on the drive side and on the freewheel side in relation to the preferential direction V.

When the gear wheels 1, 4 of the gear set are rotated in preferential direction V, the rotational speed and the torque is transmitted from the tooth flank 8 of the first gear wheel 1 on the drive side in a point of contact B to the tooth flank 8' of the second gear wheel 4 on the drive side. In this case, the tooth flank 10 of the first gear wheel 1 on the freewheel side and the opposite tooth flank 10' of the second gear wheel 4 on the freewheel side are freewheeling. The tooth flanks 8, 8' on the drive side show an involute geometry that differs from tooth flanks 10, 10' on the freewheel side. Because of the involute geometry, the gear set 1, 4 has during the entire engagement the same pressure angle α at the point of contact B when rotating in preferential direction V and touching the opposite tooth flanks 8, 8' of the first and second gear wheel 1, 4 on the drive side.

The pressure angle α of the gear wheels 1, 4 on the drive side and a pressure angle α of the gear wheels 1, 4 on the freewheel side correspond to the flank angles α on the drive side or α' on the freewheel side deducted in FIG. 1a. As shown in the diagram in FIG. 1b, for the demonstrated special case of involute geometry, the respective pressure angle α or α' is also provided by the angle of intersection between the tangent in the pitch point C and the tangent extending through the pitch point C at the base diameter of the two gear wheels 1, 4.

The respective pressure angle α or α' is also provided by the respective angle between the normal of the tangent in the point of contact B, which extends through the pitch point B, and the pitch surface W. In addition, the respective pressure angle α or α' corresponds to the flank angle α or α', the angle between the tangent in the point of contact B and the normal extending through the tooth tip 12 on the pitch surface W.

In the embodiment shown in FIGS. 1a and 1b, the flank angle or pressure angle α of the tooth flank 8, 8' on the drive side amounts to 30°. In the embodiment shown, the flank angle or pressure angle α of the tooth flank 10, 10' on the freewheel side amounts to 15°.

To determine the pressure angle α' on the freewheel side, the gear set is rotated opposite to the preferential direction V. On this occasion the tooth flanks 10, 10' on the freewheel side touch one another at a further point of contact (not shown). The angle between the normal of the tangent at the point of contact of the tooth flank 10, 10' on the freewheel side and the pitch point C corresponds to the pressure angle α when rotating opposite to the preferential direction.

FIG. 2 shows schematically a section of a helicopter drive train. From a drive system (not shown) a torque and a rotational speed are transmitted via an input shaft 14 and via a small first spur gear 16 to a large second spur gear 16', which is mounted on a first intermediate shaft 18 and which is intermeshing with first spur gear 16. As a result, the two gear wheels 16, 16' form a gear set.

At an end of the first intermediate shaft 18 located opposite of the second spur gear 16', a first bevel wheel 20 is designed which transmits the torque and the rotational speed from the input shaft 14 via the first intermediate shaft 18 to a main rotor shaft 22, which extends vertically to the first intermediate shaft 18 and which drives a main rotor associated with said first intermediate shaft 18.

At the main rotor shaft 22, a main rotor bevel wheel 26, which extends vertically to the first bevel wheel 20 and which is intermeshing with the first bevel wheel 20, is designed, as well as a first tail rotor bevel wheel 28 and a connection spur gear 30. The first bevel wheel 20 transmits the rotational speed and the torque via the main rotor bevel wheel 26 to the main rotor 24. The first tail rotor bevel wheel 28 transmits the rotational speed and the torque of the main rotor shaft 22 via an intermeshing second tail rotor bevel wheel 32 to the tail rotor intermediate shaft 34, which leads to a tail rotor 36.

The connection spur gear 30 transmits via further intermeshing spur gears (not shown) the torque and the rotational speed to ancillary units, such as a hydraulic system or an AC generator.

The transmission of the high input speed present at the input shaft 14 occurs mainly via the spur gear set formed by the first spur gear 16 and the second spur gear 16'. As a result, the spur gear set is used as a transmission gear unit A. Usually, the input shaft 14 and the intermediate shaft 18 extend in horizontal direction, i.e., in longitudinal direction of the helicopter. To transmit the rotational speed to a vertical direction, a main support rotor system B is arranged in power flow direction behind the transmission gear unit A formed by the first and second spur gear 16, 16'. Said main support rotor system B is formed by the first bevel wheel 20 and the intermeshing main rotor bevel wheel 26. Because of the similar diameter of the two intermeshing bevel wheels 20, 26, in this area no significant change in rotational speeds takes place from the drive system to the main rotor 24.

To be able to transmit the rotational speed and the torque from the drive system also to the tail rotor 36, the first tail rotor bevel wheel 28 engages with the second tail rotor bevel wheel 32. As a result, the rotational speed and the torque are again redirected to the tail rotor 36 from the vertical direction to an almost horizontal or inclined horizontal direction. The first tail rotor bevel wheel 26 engaging with the second tail rotor bevel blade 32 is provided as an intermediate transmission Z to the tail rotor. Usually a transmission (not shown) is used which transmits the rotational speed present at the main rotor shaft 22 to an appropriate rotational speed for the tail rotor 32. Generally, the tail rotor speed is higher than the main rotor speed.

At least one gear set, preferably all gear sets, can contain gear wheels with the present disclosure-based asymmetric tooth profile geometry. It is preferred to use these in cases in which high surface pressure forces have to be prevented.

REFERENCE NUMERALS 1 first gear wheel
4 second gear wheel
6, 6' tooth
8, 8' tooth flank on the drive side
10, 10' tooth flank on the freewheel side
12 tooth tip
14 input shaft
16 first spur gear
16' second spur gear
18 first intermediate shaft
20 first bevel wheel
22 main rotor shaft
24 main rotor
26 main rotor bevel wheel
28 first tail rotor bevel wheel
30 connection spur gear
32 second tail rotor bevel wheel
34 tail rotor intermediate shaft
36 tail rotor
V preferential direction α tooth flank angle on the drive side/pressure angle on the drive side
α' tooth flank angle on the freewheel side/pressure angle on the freewheel side
B point of contact
W pitch surface
A transmission gear unit
B main support rotor system
C pitch point
Z intermediate transmission

The invention claimed is:

1. A gear set for a rotary-wing aircraft, comprising:
two intermeshing gear wheels, each mounted on a respective shaft, wherein at least one of the shafts is configured to couple to a respective rotor of the rotary-wing aircraft, wherein in a normal section, a pressure angle on a drive side of said two intermeshing gear wheels is different from a pressure angle on a freewheel side of said two intermeshing gear wheels at the beginning of an engagement of said two intermeshing gear wheels;
wherein during the engagement, the pressure angle on the drive side of the two intermeshing gear wheels shows a different course than the pressure angle on the freewheel side of the said two intermeshing gear wheels; and
wherein said two intermeshing gear wheels are configured such that during the engagement, the sum of the pressure angle on the drive side of said two intermeshing gear wheels and the pressure angle on the freewheel side of said two intermeshing gear wheels remains constant;
wherein said two intermeshing gear wheels are bevel wheels such that the axes of the respective shafts intersect.

2. The gear set according to claim 1, wherein during the engagement, the pressure angle on the drive side of a gear tooth of one of said two intermeshing gear wheels is larger than the pressure angle on the freewheel side of the tooth shows a different course than the pressure angle on the freewheel side of the gear tooth of the one of said two intermeshing gear wheels.

3. The gear set according to claim 1, wherein the pressure angle on the drive side ranges between 25° and 45°.

4. The gear set according to claim 1, wherein said two intermeshing gear wheels are involute gear wheels.

5. The gear set according to claim 1, wherein the respective shafts mounted to the two intermeshing gear wheels are divergent.

6. The gear set according to claim 1, wherein said two intermeshing gear wheels have a helical or spiral design.

7. A rotating-wing aircraft transmission, comprising:
a drive system;
a main support rotor; and
a tail rotor,
wherein said rotating-wing aircraft transmission transmits a torque generated in the drive system to the main support rotor and the tail rotor, and wherein the gear set according to claim 1 is arranged in a power flow direction between the drive system and the main support rotor or the tail rotor.

8. A drive train for a rotary-wing aircraft, comprising:
a drive system;
a transmission gear unit arranged in a power flow direction between the drive system and a main support rotor; and
at least one main support rotor system arranged in a power flow direction between the drive system and the main support rotor,
wherein at least one of the transmission gear unit and the at least one main support rotor system comprises at least one gear set according to claim 1.

9. The drive train according to claim 8, further comprising a tail rotor transmission arranged in a power flow direction between the drive system and a tail rotor, wherein the tail rotor transmission comprises the gear set according to claim 1.

10. A rotary-wing aircraft comprising:
a rotor; and
a drive system for the rotor,
wherein at least one transmission provided in a power flow direction between the drive system and the rotor comprises at least one gear set according to claim 1.

11. The gear set according to claim 1, wherein the pressure angle on the drive side ranges between 28° and 32°.

12. The gear set according to claim 1, wherein the pressure angle on the freewheel side ranges between 14° and 16°.

13. The gear set according to claim 1, wherein the two intermeshing gear wheels have no undercut contour in an area where tooth flanks of the two intermeshing gear wheels touch one another during the engagement.

14. The gear set according to claim 1, wherein the pressure angle on the freewheel side ranges between 10° and 20°.

15. The drive train according to claim 8, wherein an intermediate shaft connects the transmission gear unit to the at least one main support rotor system, and a main rotor shaft connects the main support rotor system to the main support rotor.

16. The drive train according to claim 15, wherein the intermediate shaft extends in longitudinal direction of the rotary-wing aircraft, and the main rotor shaft extends in vertical direction with respect to the intermediate shaft.

* * * * *

UNITED STATES PATENT AND TRADEMARK OFFICE
CERTIFICATE OF CORRECTION

| | | |
|---|---|---|
| PATENT NO. | : 10,118,693 B2 | Page 1 of 1 |
| APPLICATION NO. | : 14/381703 | |
| DATED | : November 6, 2018 | |
| INVENTOR(S) | : Sergej Lieder and Reinhold Ruhland | |

It is certified that error appears in the above-identified patent and that said Letters Patent is hereby corrected as shown below:

On the Title Page

Insert item (30), as follows:
--(30) Foreign Application Priority Data
Mar. 1, 2012 (DE) 10 2012 203 177.4--

Signed and Sealed this
Fourteenth Day of April, 2020

Andrei Iancu
*Director of the United States Patent and Trademark Office*